(12) United States Patent
Sugawara

(10) Patent No.: US 7,083,133 B2
(45) Date of Patent: Aug. 1, 2006

(54) FISHING LINE GUIDE MECHANISM FOR A SPINNING REEL AND METHOD OF MANUFACTURING THE SAME

(75) Inventor: Ken'ichi Sugawara, Osaka (JP)

(73) Assignee: Shimano Inc., Osaka (JP)

( * ) Notice: Subject to any disclaimer, the term of this patent is extended or adjusted under 35 U.S.C. 154(b) by 281 days.

(21) Appl. No.: 10/811,954

(22) Filed: Mar. 3, 2004

(65) Prior Publication Data

US 2004/0206839 A1 Oct. 21, 2004

(30) Foreign Application Priority Data

Apr. 18, 2003 (JP) ............................. 2003-114064
Dec. 10, 2003 (JP) ............................. 2003-411637
Dec. 19, 2003 (JP) ............................. 2003-422026

(51) Int. Cl.
*A01K 89/02* (2006.01)

(52) U.S. Cl. ............................................... 242/231

(58) Field of Classification Search ......... 242/230–233
See application file for complete search history.

(56) References Cited

U.S. PATENT DOCUMENTS

| 5,261,627 | A | * | 11/1993 | Shinohara | 242/231 |
| 5,379,958 | A | * | 1/1995 | Takeuchi | 242/232 |
| 5,799,889 | A | * | 9/1998 | Plestan | 242/231 |
| 5,848,757 | A | * | 12/1998 | Amano et al. | 242/231 |
| 5,868,331 | A | * | 2/1999 | Shinohara et al. | 242/231 |
| 6,220,537 | B1 | | 4/2001 | Amano et al. | |
| 6,318,654 | B1 | * | 11/2001 | Amano et al. | 242/231 |
| 6,405,955 | B1 | * | 6/2002 | Furomoto | 242/231 |
| 6,595,449 | B1 | * | 7/2003 | Ikuta et al. | 242/231 |
| 6,637,690 | B1 | * | 10/2003 | Matsuda | 242/231 |

FOREIGN PATENT DOCUMENTS

| EP | 1228688 A | 8/2002 |
| EP | 1393626 A | 3/2004 |
| EP | 1407662 A | 4/2004 |
| JP | 10-117644 A | 5/1998 |

* cited by examiner

*Primary Examiner*—Emmanuel M Marcelo
(74) *Attorney, Agent, or Firm*—Global IP Counselors, LLP

(57) ABSTRACT

A bail arm of a spinning reel includes first and second bail support members, a bail, a fixed shaft, a line roller, and a fixed shaft cover. The front end of the fixed shaft on one end is fixedly coupled to the first bail support member. The fixed shaft cover is fixedly attached to another end of the fixed shaft so as to be spaced apart from the first bail support member. The line roller is rotatively supported by the fixed shaft. The bail is curved outward in the circumferential direction of the spool to guide the fishing line onto the line roller via the fixed shaft cover. The fixed shaft cover and the bail are integrally formed from a stainless steel alloy such that the exteriors thereof are smoothly and continuously connected. In this way, fishing line is not likely to tangle in the fishing line guide mechanism.

20 Claims, 17 Drawing Sheets

FISHING LINE GUIDE MECHANISM FOR A SPINNING REEL AND METHOD OF MANUFACTURING THE SAME

BACKGROUND OF THE INVENTION

1. Field of the Invention

The present invention relates to a fishing line guide mechanism. More particularly the present invention relates to a fishing line guide mechanism that guides fishing line onto a spool and a method of manufacturing the same, the fishing line guide mechanism being mounted pivotably between a line-guiding posture and a line-releasing posture to front ends of first and second rotor arms.

2. Background Information

A spinning reel is provided with a fishing line guide mechanism that guides fishing line onto a spool. The fishing line guide mechanism is mounted to front ends of a first and a second rotor arms to rotate with a rotor, and is arranged pivotably between a line-releasing posture and a line-guiding posture. The fishing line guide mechanism is furnished with a first and a second bail support members, a fixed shaft, one end of which is fastened to the front end of the first bail support member, a fixed shaft cover fastened to the other end of the fixed shaft, a bail in which one end thereof is inserted into the fixed shaft cover, and a line roller supported by the fixed shaft. One end of the bail is inserted into and fastened to the fixed shaft cover, and a leveled surface is created at the portion where the bail joins the fixed shaft cover. The other end of the bail is fitted to the front end of the second bail support member as seen in, for example, Japanese Patent Application Publication H10-117644.

When winding fishing line onto the spool with a spinning reel equipped with a fishing line guide mechanism like this, the bail is flipped into the line-guiding posture and the handle is rotated. When this occurs, the fishing line is led by the bail and guided to the outer peripheral surface of the line roller via the fixed shaft cover. Then, guided by the line roller, the direction of the fishing line is changed, and the finishing line is wound around the outer periphery of the spool.

With a conventional fishing line guide mechanism for a spinning reel, one end of a bail is inserted into an end portion of a fixed shaft cover, and a leveled surface is created at the portion joining the fixed shaft cover and the bail. Thus, for example, when fishing line is wound and the bail is shifted to the fixed shaft cover, there is a possibility that the fishing line will snag on the uneven surface. When the fishing line is snagged on the leveled surface, it prevents the fishing line from being smoothly guided and causes the fishing line to be twined between the fixed shaft cover and the bail, which makes it easy for the fishing line to be tangled.

In view of the above, it will be apparent to those skilled in the art from this disclosure that there exists a need for an improved fishing line guide mechanism for a spinning reel that overcomes the above-stated problem. This invention addresses this need in the art as well as other needs, which will become apparent to those skilled in the art from this disclosure.

SUMMARY OF THE INVENTION

An object of the present invention is to prevent line tangling from easily occurring in a fishing line guide mechanism for a spinning reel and to provide a method of manufacturing such fishing line guide mechanism.

The fishing line guide mechanism for a spinning reel according to the first aspect of the present invention is adapted to be pivotably mounted between a line-guiding posture and a line-releasing posture to front ends of a first rotor arm and a second rotor arm, and guides fishing line onto a spool. The fishing line guide mechanism for a spinning reel includes a first bail support member and a second bail support member pivotably mounted respectively to front ends of the first rotor arm and the second rotor arm, a fixed shaft having one end thereof coupled to the first bail support member, a fixed shaft cover that is fixedly attached to another end of the fixed shaft so as to be spaced apart from the first bail support member, a line roller that is rotatively supported by the fixed shaft and has on its outer peripheral surface a guiding portion for guiding fishing line, and a bail that is curved outward in the circumferential direction of the spool to guide the fishing line onto the line roller via the fixed shaft cover, one end of the bail being fixedly attached to the second bail support member. The fixed shaft cover and the bail being are integrally formed from a metal such that the exteriors thereof are smoothly and continuously connected.

With this fishing line guide mechanism, the fixed shaft cover and the bail are integrally formed so that the exteriors thereof are smoothly and continuously connected. Accordingly, there is no leveled surface created between the fixed shaft cover and the bail as in the conventional case where the fixed shaft cover and the bail are formed separately. Thus, for example, when fishing line is wound up and moves from the bail to the fixed cover, it will be difficult for the fishing line to become snagged. Thus, the fishing line will be smoothly guided from the bail to the fixed cover, which makes it difficult for line tangling to occur.

A fishing line guide mechanism according to the second aspect of the present invention is the fishing line guide mechanism of the first aspect, in which the fixed shaft cover and the bail are made of a stainless steel alloy. Here, forming the fixed shaft cover and the bail from a high strength stainless steel alloy allows the fixed shaft cover and the bail to maintain a high degree of strength.

A fishing line guide mechanism according to the third aspect of the present invention is the fishing line guide mechanism of the first or second aspect, in which the fixed shaft is made of metal component formed integrally with the fixed shaft cover as a one-piece unitary member. Here, because the fixed shaft, the fixed cover and the bail are integrally formed with each other, the total number of parts is reduced and manufacturing cost can be kept low.

A fishing line guide mechanism according to the fourth aspect of the present invention is the fishing line guide mechanism of any of the first through third aspects, in which the second bail support member is a metal component formed integrally with the bail as a one-piece unitary member. Here, for example, when the exteriors of the fixed shaft cover, bail and the second bail support member are integrally formed to be smooth and continuous with each other, a leveled surface between the second bail support member and the bail will not be created, which makes it unlikely for the fishing line to become snagged on this portion. In addition, the joint strength and durability of the second bail support member and the bail can be improved compared to when the second bail support member and the bail are formed separately.

A fishing line guide mechanism according to the fifth aspect of the present invention is the fishing line guide mechanism of any of the first through fourth aspects, in which the first bail support member includes a first engaged portion, and the fixed shaft includes a shaft portion and a first engaging portion that is formed at an end of the shaft portion and non-rotatably engages with the first engaged portion, the line roller being supported on an outer periphery of the shaft portion.

A fishing line guide mechanism according to the sixth aspect of the present invention is the fishing line guide mechanism of the fifth aspect, in which the fixed shaft further includes a head portion that has a larger diameter than a diameter of the shaft portion; and the fixed shaft cover includes a recessed portion and a through hole, the through hole being formed within the recessed portion and having a diameter smaller than that of the head portion, the shaft portion passing through the through hole, the head portion being accommodated in the recessed portion.

A fishing line guide mechanism according to the seventh aspect of the present invention is the fishing line guide mechanism of the fifth or sixth aspect, in which the fixed shaft cover is formed separately from the fixed shaft, the fixed shaft includes a second engaging portion formed at least partially on an outer periphery of an end of the fixed shaft, and the fixed shaft cover includes a second engaged portion that is formed at least partially on an end of the fixed shaft cover, the second engaged portion being non-rotatably engaged with the second engaging portion.

A fishing line guide mechanism according to the eighth aspect of the present invention is the fishing line guide mechanism of the seventh aspect, in which the second engaging portion is formed on the outer periphery of the fixed shaft, the fixed shaft cover includes a through hole, the shaft portion passing through the through hole, and the second engaged portion is formed on the inner periphery of the through hole.

A fishing line guide mechanism according to the ninth aspect of the present invention is the fishing line guide mechanism of the seventh or eighth aspect, in which the fixed shaft further includes a head portion that has a larger diameter than a diameter of the shaft portion, the second engaging portion is formed on the outer periphery of the head portion, the fixed shaft cover includes a recessed portion and a through hole that is formed within the recessed portion, the through hole having a diameter smaller than a diameter of the head portion, the shaft portion passing through the through hole, the head portion being accommodated in the recessed portion, and the second engaged portion is formed on the inner periphery of the recessed portion.

A fishing line guide mechanism according to the tenth aspect of the present invention is the fishing line guide mechanism of any of the seventh through ninth aspects, in which the second engaging portion and the second engaged portion are formed in non-circular shapes.

A fishing line guide mechanism according to the eleventh aspect of the present invention is the fishing line guide mechanism of any of the first through tenth aspects, in which the fixed shaft cover is formed separately from the fixed shaft, and the fixed shaft cover portion has a bore portion into which an end of the fixed shaft is press fitted.

A fishing line guide mechanism according to the twelfth aspect of the present invention is the fishing line guide mechanism of any of the first through eleventh aspects, in which at least one of the fixed shaft cover and the bail is formed by a manufacturing process that includes a forging process.

A fishing line guide mechanism according to the thirteenth aspect of the present invention is the fishing line guide mechanism of any of the first through twelfth aspects, in which the bail and the fixed shaft cover are integrally formed as a one-piece unitary member by a manufacturing process that includes swaging of a metal member.

A method of manufacturing fishing line guide mechanism for a spinning reel according to the fourteenth aspect of the present invention is a method in which the fixed shaft cover and the bail that make up the fishing line guide mechanism are integrally formed by metal as a one-piece unitary member. The fishing line guide mechanism is pivotably attached to the front ends of the first rotor arm and the second rotor arm of the spinning reel. The method includes a base material providing process in which a base material made of a metal will become the fixed shaft cover and the bail is provided, a metal forming process in which metal-forming is performed on at least one of a portion that will become the fixed shaft cover and a portion that will become the bail, a first cutting process in which cutting is performed on at least the portion of the base material that will become the fixed shaft cover, and a bending process in which bending is performed on at least the portion of the base material that will become the bail. Here, the fixed shaft cover or the bail can be easily formed by processing the base material with the base material providing process, the metal forming process, the first cutting process and the bending process.

A method of manufacturing the fishing line guide mechanism according to the fifteen aspect of the present invention is the method of manufacturing the fishing line guide mechanism of the fourteenth aspect, wherein the metal forming process includes a forging process in which forging is performed. Here, forming the fixed shaft cover or the bail by a forging process allows them to maintain a high degree of rigidity.

A method of manufacturing the fishing line guide mechanism according to the sixteenth aspect of the present invention is the method of manufacturing the fishing line guide mechanism of the fifteenth aspect, wherein the forging process is performed on both of the portions that will become the fixed shaft cover and the bail. Here, forming the fixed shaft cover and the bail by a forging process allows them to maintain a high degree of rigidity.

A method of manufacturing the fishing line guide mechanism according to the twenty-seventh aspect of the present invention is the method of manufacturing the fishing line guide mechanism of one of the fourteenth through sixteenth aspects, further including a barrel polishing in which dry barrel polishing is performed on at least one of the portion of the base material that will become the fixed shaft cover and the portion that will become the bail, the barrel polishing being performed after the bending process. Here, for example, by performing a dry barrel polishing after the bending process, the surface of the fixed cover or the bail is mirror-finished, and thus a finishing process of the fixed shaft cover or the bail will be the final process after the bending process. Furthermore, when a wet barrel polishing is performed before the bending process, the fixed shaft cover or the bail will be removed of burrs and thus the bending process will be made easier.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overall Configuration and Configuration of the Reel Unit

Figure 1:
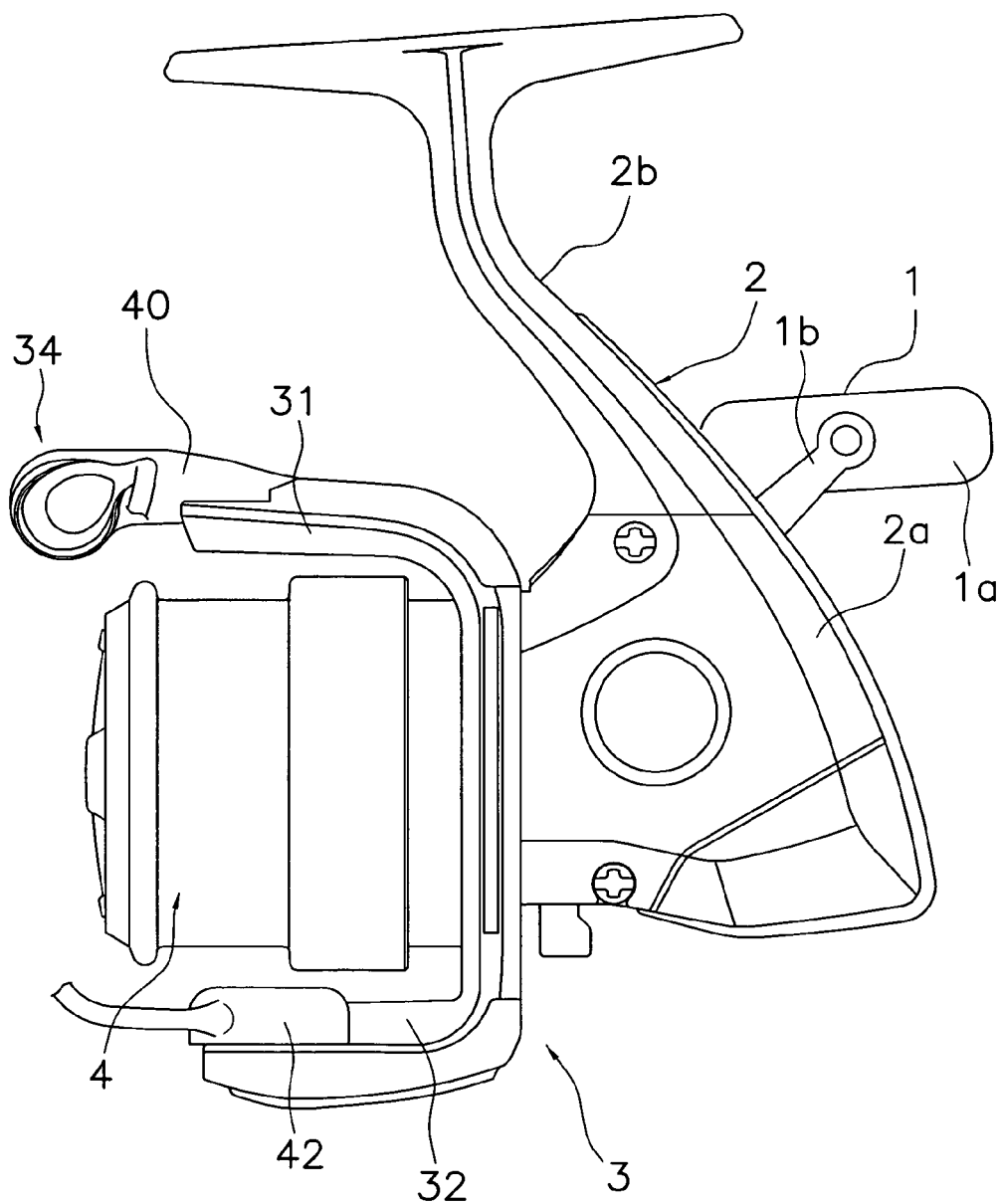
FIG. 1 is a right side cross sectional view of a spinning reel in accordance with an embodiment of the present invention is employed.
Figure 2:
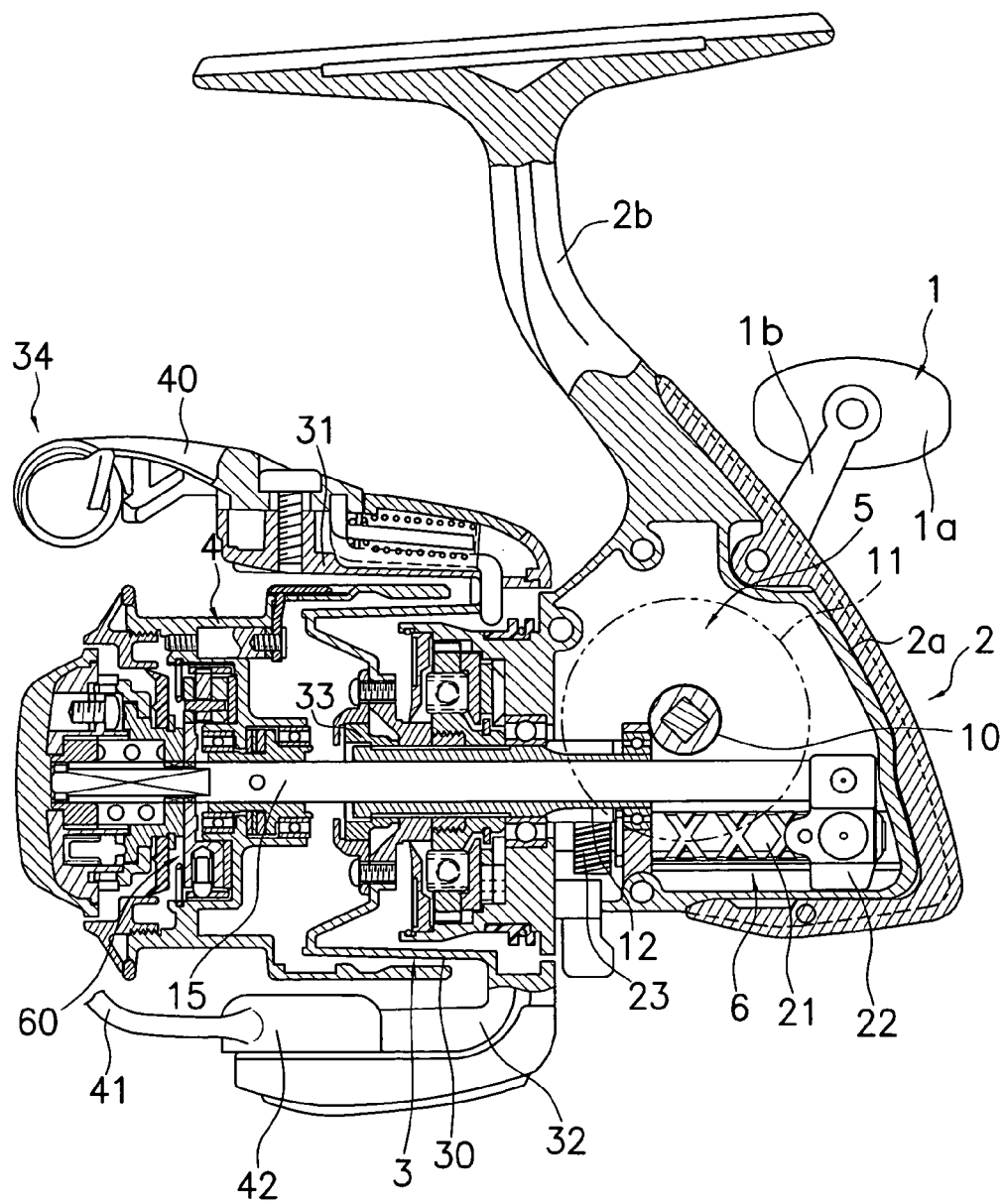
FIG. 2 is a left side cross-sectional view of the spinning reel in accordance with the embodiment of the present invention.

As shown in FIGS. 1 and 2, a spinning reel in accordance with an embodiment of the present invention includes a handle 1, a reel unit 2 that rotatively supports the handle 1, a rotor 3, and a spool 4. The rotor 3 is rotatively supported at the front of the reel unit 2. The spool 4 has fishing line wound around the outer peripheral surface thereof, and is disposed on the front of the rotor 3 so that it can be shifted back and forth.

The handle 1 includes a T-shaped grip portion 1a and an L-shaped crank arm 1b whose tip end is rotatively attached to the grip portion 1a.

As shown in FIGS. 1 and 2, the reel unit 2 includes a reel body 2a having an opening on its side and a T-shaped rod attachment leg 2b extending diagonally upward to the front and formed integrally with the reel body 2a. As shown in FIG. 2, the reel body 2a has a mechanism accommodating space in the interior thereof, which accommodates a rotor drive mechanism 5 and an oscillating mechanism 6. The rotor drive mechanism 5 transmits the rotation of the handle 1 to rotate the rotor 3. The oscillating mechanism 6 serves to uniformly wind up the fishing line by shifting the spool 4 back and forth.

As shown in FIGS. 1 and 2, the spool 4 is disposed between a later-described first rotor arm 31 and a later-described second rotor arm 32 of the rotor 3, and the center portion of the spool 4 is coupled to the front end of the spool shaft 15 via a drag mechanism 60 (see FIG. 2).

As shown in FIG. 2, the rotor drive mechanism 5 includes a handle shaft 10, a master gear 11 and a pinion gear 12. The master gear 11 rotates together with the handle shaft 10, on which the handle 1 is mounted non-rotatively. The pinion gear 12 meshes with the master gear 11. Both ends of the handle shaft 10 are rotatively supported on the reel unit 2 via bearings. The rotor drive mechanism is a conventional component that is well known in the art. Accordingly, its structure will not be discussed or illustrated in detail herein.

The pinion gear 12 is formed in a hollow tubular shape, the front portion of the pinion gear 12 extends through the center portion of the rotor 3, and the pinion gear 12 is secured to the rotor 3 by a nut 33. The middle and the rear end of the pinion gear 12 in the axial direction are respectively and rotatively supported on the reel unit 2 via bearings.

The oscillating mechanism 6 serves to shift the spool 4 back and forth. As shown in FIG. 2, the oscillating mechanism 6 includes a worm 21, a slider 22, and an intermediate gear 23. The worm 21 is arranged substantially below and parallel to the spool shaft 15. The slider 22 moves back and forth along the worm 21, and the intermediate gear 23 is fixedly coupled to the front end of the worm 21. A rear end of the spool shaft 15 is non-rotatably and fixedly coupled to the slider 22. The intermediate gear 23 meshes with the pinion gear 12 via a reduction gear mechanism (not shown). The oscillating mechanism is a conventional component that is well known in the art. Accordingly, its structure will not be discussed or illustrated in detail herein.

Configuration of the Rotor

As shown in FIG. 2, the rotor 3 includes a cylindrical portion 30 fixedly coupled to the pinion gear 12, a first rotor arm 31 and a second rotor arm 32 disposed opposite to one another at the sides of the cylindrical portion 30, and a bail arm 34 that serves as a fishing line guide mechanism for guiding the fishing line to the spool 4. The cylindrical portion 30 and the first and second rotor arms 31 and 32 are, for example, made of an aluminum alloy, and are integrally formed with each other as a one-piece unitary member. As noted above, the front and center portions of the cylindrical portion 30 are fixedly coupled non-rotatively to the front portion of the pinion gear 12 with the nut 33.

Bail Arm Configuration

Figure 3:
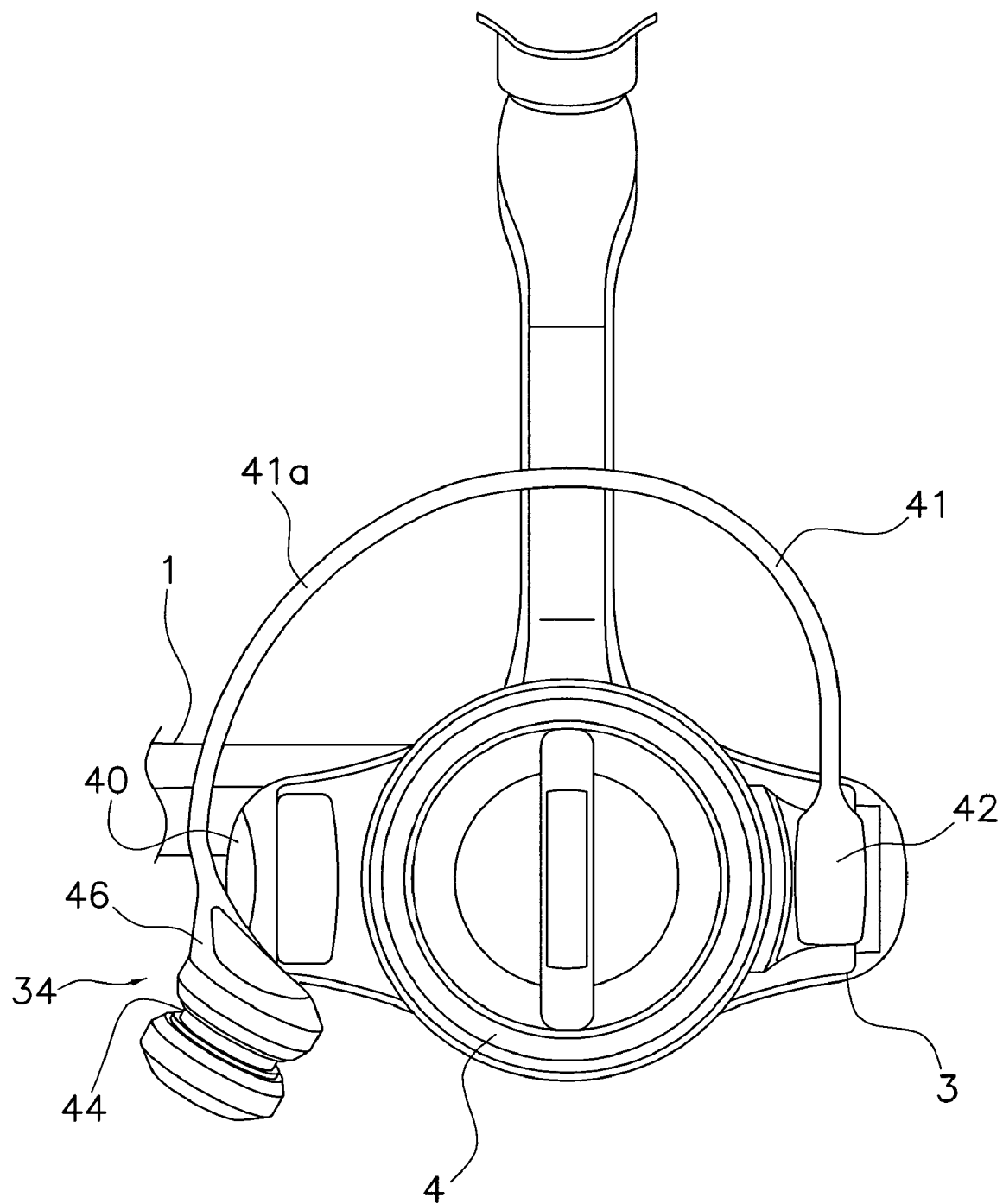
FIG. 3 is a front view of the spinning reel in accordance with the embodiment of the present invention.
Figure 5:
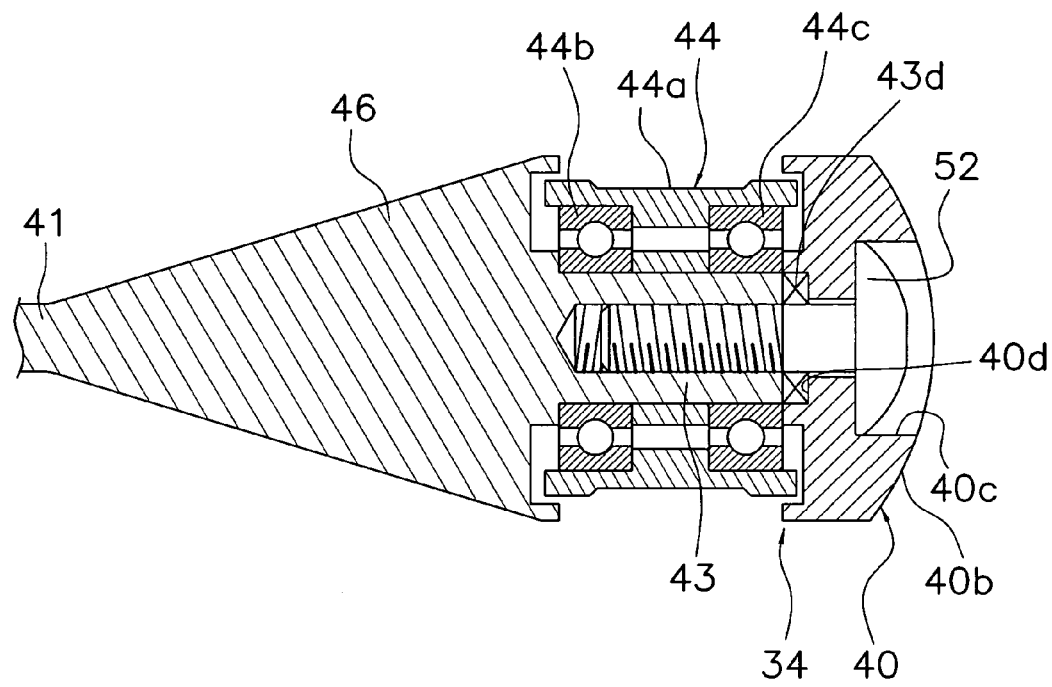
FIG. 5 is a cross-sectional view of the principal elements of the bail arm in accordance with the embodiment of the present invention.

The bail arm (an example of fishing line guide mechanism) 34 is disposed at the front end of the first rotor arm 31 and the second rotor arm 32, and is pivotable between the line-guiding posture and the line-release posture. The bail arm 34 includes a first bail support member 40 and a second bail support member 42 that are pivotably mounted respectively on the front ends of the first rotor arm 31 and the second rotor arm 32. The first bail support member 40 is pivotably mounted on the outer side of the first rotor arm 31, while the second bail support member 42 is pivotably mounted on the inner side of the second rotor arm 32. As shown in FIGS. 3 and 5, the bail arm 34 further includes a bail 41 that connects the first bail support member 40 and the second member 42, a fixed shaft 43 (see FIG. 5) whose tip end is fixedly coupled to the first bail support member 40, a line roller 44 that is supported by the fixed shaft 43, and a fixed shaft cover 46 that covers the fixed shaft 43. Here, the exterior of the fixed shaft cover 46, the bail 41 and the second bail support member 42 are integrally formed by a stainless steel alloy so that the exterior of the fixed shaft cover 46, the bail 41 and the second bail support member 42 are smooth and continuous.

Figure 4:
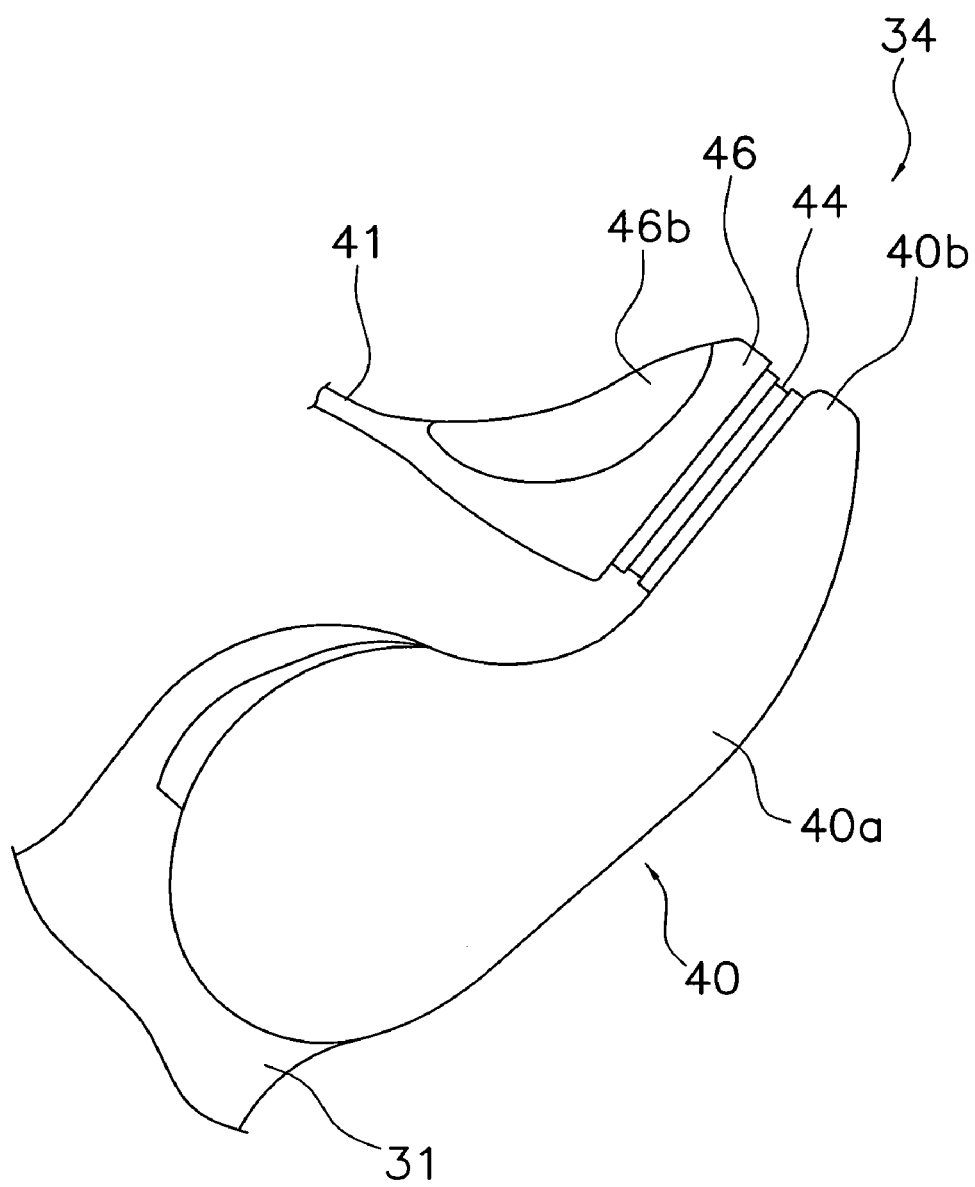
FIG. 4 is an oblique view of the principal elements of the bail arm in accordance with the embodiment of the present invention.

As shown in FIGS. 4 and 5, the first bail support member 40 includes an arm portion 40a that is pivotably mounted on the first rotor arm 31, and a ring-shaped mounting portion 40b that is integrally formed with a front portion of the arm portion 40a. The mounting portion 40b is provided with a stepped through hole 40c (see FIG. 5). A fixing bolt 52 for fixedly coupling the fixed shaft 43 to the first bail support member 40 is passed through the through hole 40c. In addition, as shown in FIG. 5, a first engaged portion 40d having two recessed portions with which later described first engaging portions 43d of the fixed shaft 43 can be non-rotatably engaged is formed on a front rim portion of the through hole 40c.

As shown in FIG. 3, the bail 41 is a wire-shaped member made of a stainless steel alloy, whose respective ends are fastened to the second bail support member 42 and the fixed shaft cover 46. The bail 41 curves outward in the circumferential direction of the spool 4. The bail 41 serves to guide fishing line via the fixed shaft cover 46 to the line roller 44 when the bail arm 34 returns from the line-release posture to the line-guiding posture.

As shown in FIG. 5, the fixed shaft 43 is integrally formed with the fixed shaft cover 46 as a one-piece unitary member. The fixed shaft 43 extends from its base end, which is integral with the fixed shaft cover 46, toward the first bail support member 40, and the tip end of the fixed shaft 43 is fixedly coupled to the first bail support member 40 by the fixing bolt 52. Two first engaging portions 43d that non-rotatably engage respectively with the first engaged portion 40d of the first bail support member 40 are formed on the tip end of the fixed shaft 43. The first engaging portions 43d are disposed in positions so as to oppose each other and formed so that the outer contours of the first engaging portions 43d are approximately the same as those of the first engaged portions 40d.

As shown in FIG. 5, the line roller 44 includes a cylindrical guiding portion 44a whose outer peripheral surface is provided with a groove for guiding fishing line, and two ball bearings 44b and 44c that are arranged spaced apart in the axial direction on the inner peripheral side of the guide portion 44a. The guide portion 44a is rotatably supported on the fixed shaft 43 via the two bearings 44b and 44c.

As shown in FIG. 5, the fixed shaft cover 46 is provided on the base end of the fixed shaft 43 spaced apart from the mounting portion 40b of the first bail support member 40. The fixed shaft cover 46 is an approximately truncated conical member whose front end is the vertex, and whose exterior is formed with a smooth curved surface. The front end of the fixed shaft cover 46 is integrally formed with one end of the bail 41. As shown in FIGS. 1 and 3, the other end of the bail 41 is integrally formed with the second bail support member 42.

Manufacturing Process of Bail Arm

Figure 6:
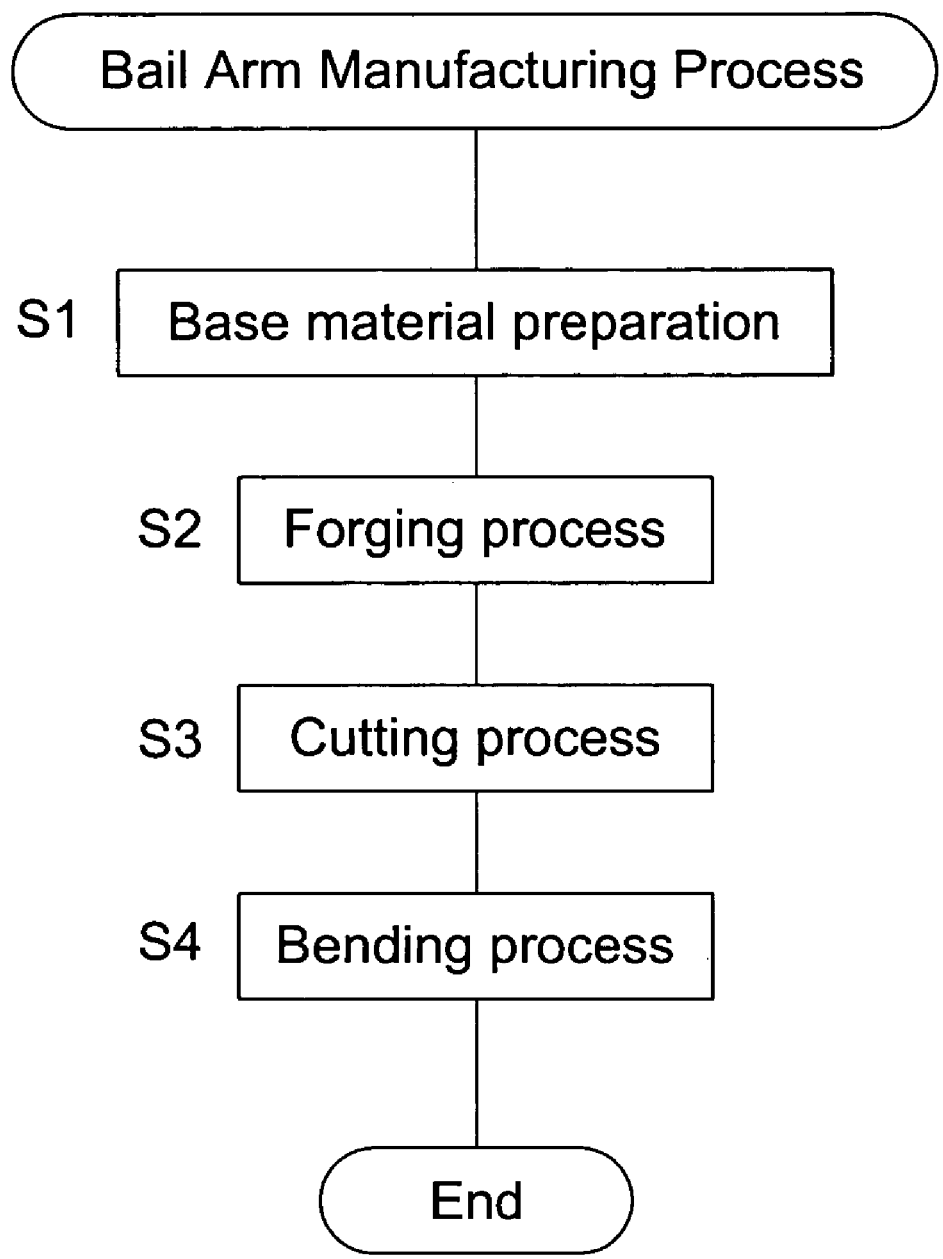
FIG. 6 is a flowchart illustrating a manufacturing process of the bail arm in accordance with the embodiment of the present invention.
Figure 7:
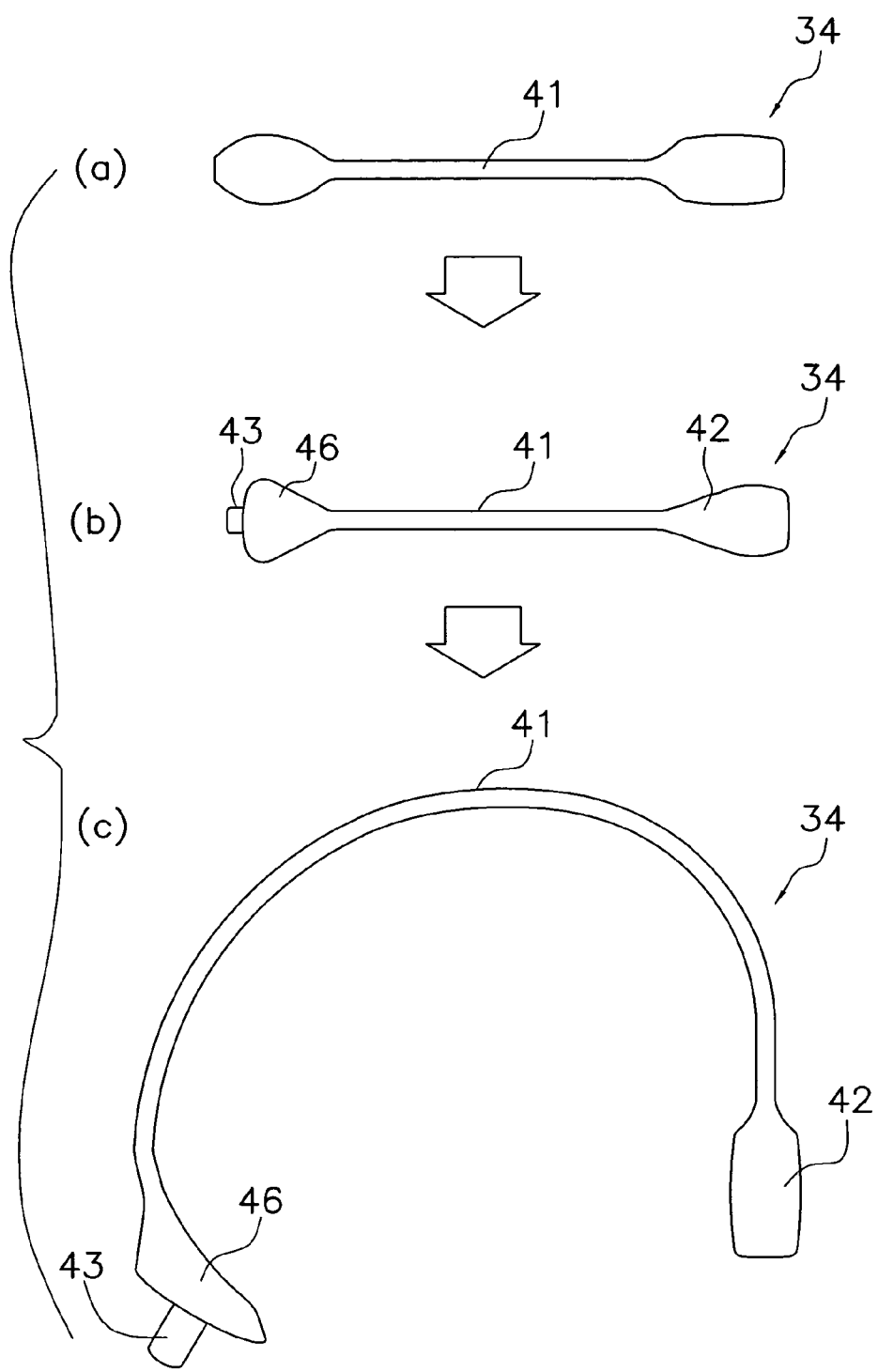
FIG. 7 is a view illustrating a manufacturing process of the bail arm in accordance with the embodiment of the present invention.

FIGS. 6 and 7 show the process by which this bail arm 34 of the present embodiment is manufactured. First, in step S1, a rod-shaped base material made of a stainless steel alloy is prepared. Next, in step S2, a forging process (an example of metal forming process) is performed on the stainless steel alloy material, and a rough outline of the bail 41 is formed (see FIG. 7(a)). Next, in step S3, a cutting process is performed on the forged stainless steel alloy material, and the detailed shapes of the fixed shaft 43, the fixed shaft cover 46 and the second bail support member 42 are formed (see FIG. 7(b)). Next, in step S4, a bending process is performed on the stainless steel alloy material, and in particular, the bail 41 is bent to form the overall outline of a bail (see FIG. 7(c)). Furthermore, a finishing process such as polishing is performed (not shown in the figures), thereby providing the bail arm 34 that is integrally formed as a one-piece unitary member, such that the exteriors of the shaft 43, the fixed shaft cover 46, the bail 41 and the second bail support member 42 are smooth and continuous with each other.

With this spinning reel, the fixed shaft cover 46 and the bail 41 are integrally formed so that the exteriors thereof are smooth and continuous. Here, because the exteriors thereof are integrally formed to be smooth and continuous, there is no leveled surface between the fixed shaft cover and the bail that are formed separately as in the case of a conventional bail arm. Thus, for example, when the fishing line is wound and shifts from the bail 41 to the fixed shaft cover 46, it will be difficult for the fishing line to become snagged between the bail 41 and the fixed shaft cover 46. Thus, the fishing line will be smoothly guided from the bail 41 to the fixed shaft cover 46, and it will be difficult for a line tangling to occur.

Other Embodiments

Variation (a)

In the aforementioned embodiment, a front drag type spinning reel was used as an example. However, the present invention can also be applied to any type of spinning reel, such as rear drag type spinning reels, spinning reels that do not have a drag, lever drag spinning reels, and the like.

Variation (b)

In the aforementioned embodiment, the fixed shaft 43, the fixed shaft cover 46, the bail 41 and the second bail support member 42 are made of a stainless steel alloy. However, the material of which the fixed shaft, the fixed shaft cover, the bail and the second bail support member are to be made is not limited thereto, and other metal materials such as an aluminum alloy or a titanium alloy may be used.

Variation (c)

In the aforementioned embodiment, a cutting process is performed on the fixed shaft 43, the fixed shaft cover 46, the bail 41 and the second bail support member 42 after the forging process, and then a bending process is performed after the cutting process. However, the manufacturing process of the present invention is not limited thereto and the fixed shaft 43, the fixed shaft cover 46, the bail 41 and the second bail support member 42 may be formed, for example, by any other metal forming process such as swaging process or the like instead of the forging process. In addition, it is possible to form the fixed shaft 43, the fixed shaft cover 46, and the bail 41 only by a cutting process.

Variation (d)

Figure 8:
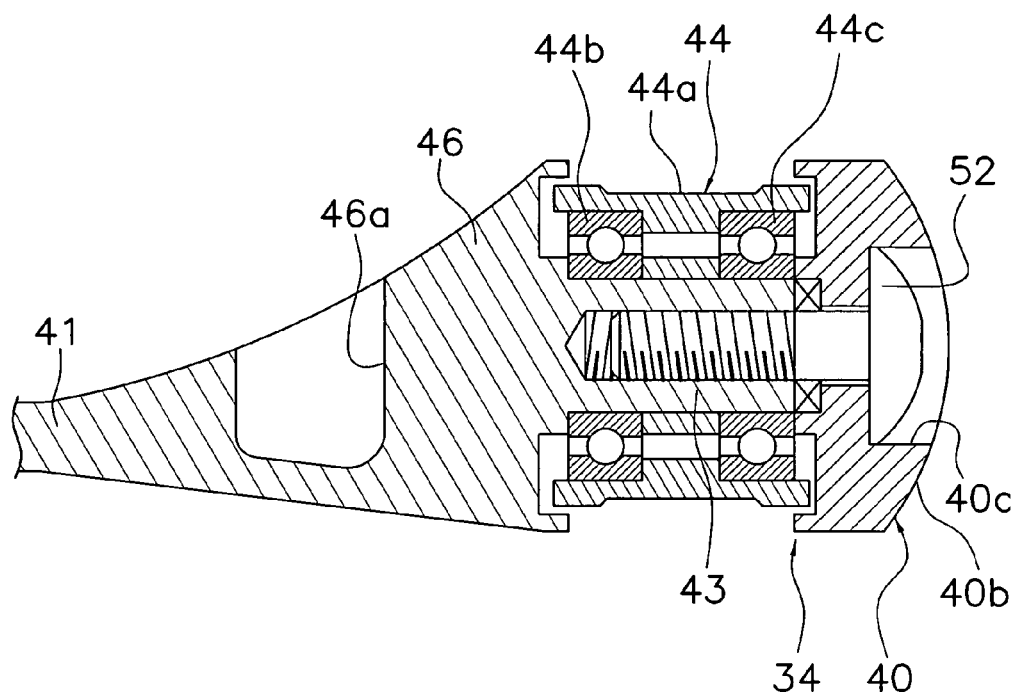
FIG. 8 is a cross-sectional view of the bail arm of the spinning reel in accordance with the variation (d) of the embodiment of the present invention.

In the aforementioned embodiment, the exterior of the fixed shaft cover 46 is formed with a smooth curved surface. However as shown in FIG. 8, a recess portion 46*a* may be formed in a ridgeline portion of the fixed shaft cover 46, which is opposite the fishing line guiding side. By forming the recessed portion 46*a* on the fixed shaft cover 46, the weight of the fixed shaft cover 46 can be reduced by the amount of the recessed portion, and an optimal rotor balance can be maintained by varying the size of the recessed portion. Note that, although not shown in the figures, a through hole that passes through the fixed shaft cover 46 can be formed instead of the recessed portion 46*a*. Here, forming the through hole is easier than forming the recessed portion 46*a*.

Variation (e)

Figure 9:
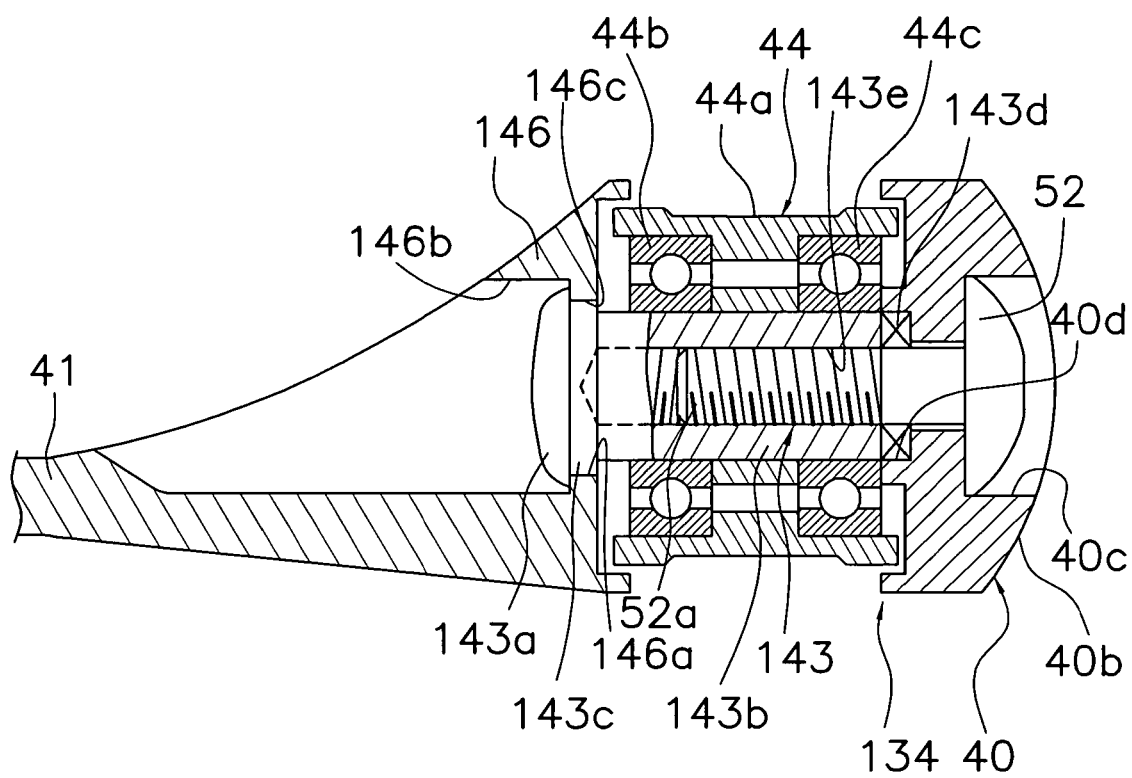
FIG. 9 is a cross-sectional view of the bail arm of the spinning reel in accordance with the variation (e) of the embodiment of the present invention.

In the aforementioned embodiment, the fixed shaft 43 is integrally formed with the fixed shaft cover 46 from a stainless steel alloy. However, as shown in FIG. 9, the fixed shaft 143 can also be formed from an aluminum alloy separately from the fixed shaft cover 146. The fixed shaft 143 is a bolt-shaped member and extends from a mounting side of the fixed shaft cover 146 toward the first bail support member 40, and its tip end is fixedly coupled to the first bail support member 40 by a fixing bolt 52.

Figure 10:
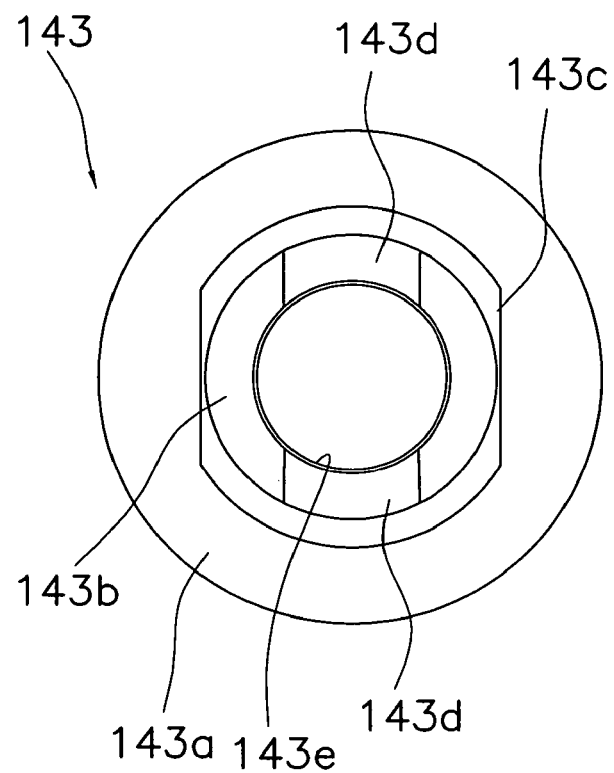
FIG. 10 is a front view of the fixed shaft in accordance with the variation (e) of the embodiment of the present invention.
Figure 11:
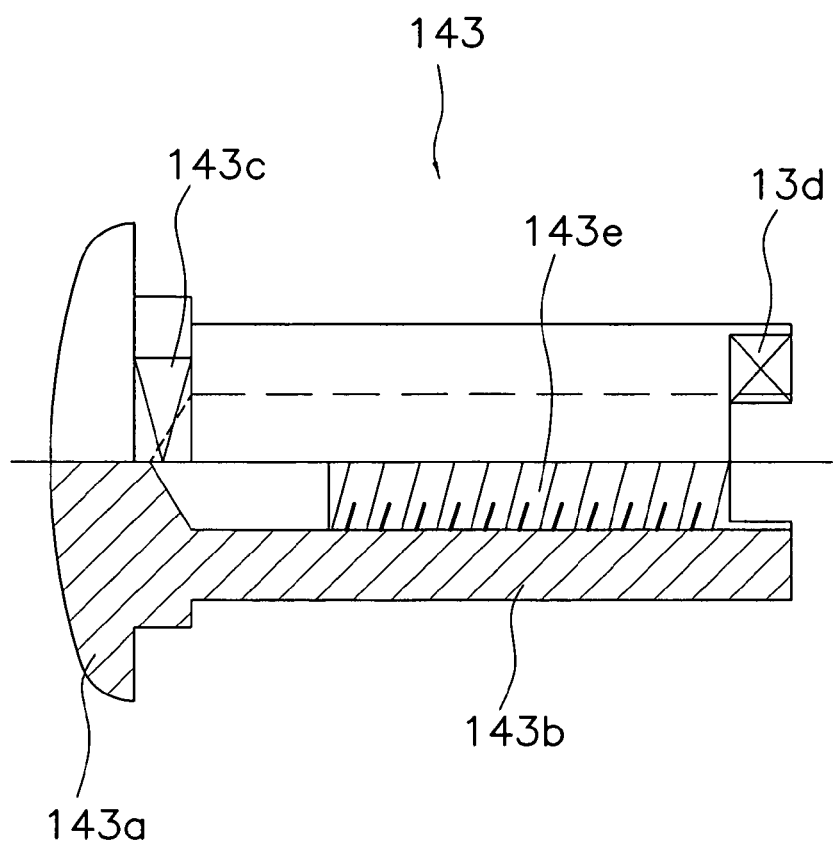
FIG. 11 is an enlarged cross-sectional view of a portion of the fixed shaft in accordance with the variation (e) of the embodiment of the present invention.

As shown in FIG. 10 and 11, the fixed shaft 143 includes a head portion 143*a*, and a shaft portion 143*b* on the outer periphery of which the line roller 44 is mounted. As shown in FIG. 9, the head portion 143*a* is formed so that it has a larger diameter than the fixed shaft 143*b*, and is entirely accommodated in a later described recessed-portion 146*b* of the fixed shaft cover 146. The shaft portion 143*b* passes though a through hole 146*a* that is formed within a recessed portion 146*b* of the fixed shaft cover 146 and has a diameter smaller than that of the head portion 143*a*. The shaft portion 143*b* has a threaded bore 143*e*, into which the fixing bolt 52 is threadedly coupled to fixedly couple the first bail support member 40 to the fixed shaft 143.

Two first engaging portions 143*d* that non-rotatably engage respectively with the first engaged portion 40*d* of the first bail support member 40 are formed on the tip end of the shaft portion 143*b*. The first engaging portions 143*d* are disposed in positions in so as to oppose each other and formed so that the outer contours thereof are approximately the same as those if the first engaged portions 40*d*.

On the outer periphery of the base end of the fixed shaft 143*b*, a second engaging portion 143*c* is formed and non-rotatably engages with a later described second engaged portion 146*c* of the fixed shaft cover 146. The outer contour of the first engaging portions 143*c* is formed so that its cross section in the axial direction is non-circular, for example an oval shape that has opposing parallel surfaces. Here, by non-rotatably engaging the second engaging portion 143*c* with the second engaged portion 146*c*, the position of the fixed shaft 143 is stabilized with respect to the fixed shaft cover 146.

The line roller 44 is same as the aforementioned embodiment. Therefore, explanation thereof is omitted herein.

As shown in FIG. 9, the fixed shaft cover 146 is arranged on the base end of the fixed shaft 143 so as to be spaced apart the mounting portion 40*b* of the first bail support member 40. The fixed shaft cover 146 is a substantially truncated conical member whose front end is the vertex, and its exterior is has a smooth curved surface.

The fixed shaft 143 passes through the fixed shaft cover 146 from its front end portion to its base end portion so that the fixed shaft 143 can be mounted to the fixed shaft cover 146 from the front end portion side of the fixed shaft cover 146. A recessed portion 146*b* that accommodates the head portion 143*a* of the fixed shaft 143 is shaped into a close-ended cylinder by a cutting process, and is formed on a front end portion of the fixed shaft cover 146. A small diameter through hole 146*a* is formed in the closed end of the recessed portion 146*b*. The shaft portion 143*b* of the fixed shaft 143 is mounted through the through hole 146*a* on the closed end of the recessed portion 146*b*, and extends from the recessed portion 146*b* toward the first bail support member 40. The second engaged portion 146*c* with which the second engaging portion 143*c* of the fixed shaft 143 can be engaged is formed on an inner periphery of the through hole 146*a*. The contour of the second engaged portion 146*c* is formed into an oval shape having opposing parallel surfaces such that it is approximately the same as the outer contour of the second engaging portion 143*c*. In addition, the front end of the fixed shaft cover 146 is integrally formed with an end of the bail 41. As shown in FIG. 1, the other end of the bail 41 is formed integrally with at least a part of the second bail support member 42.

Here, by forming a separate fixed shaft 143 from an aluminum alloy, the processing of the fixed shaft 143 will be made easier and the fixed shaft 143 will be made lighter.

Variation (f)

Figure 12:
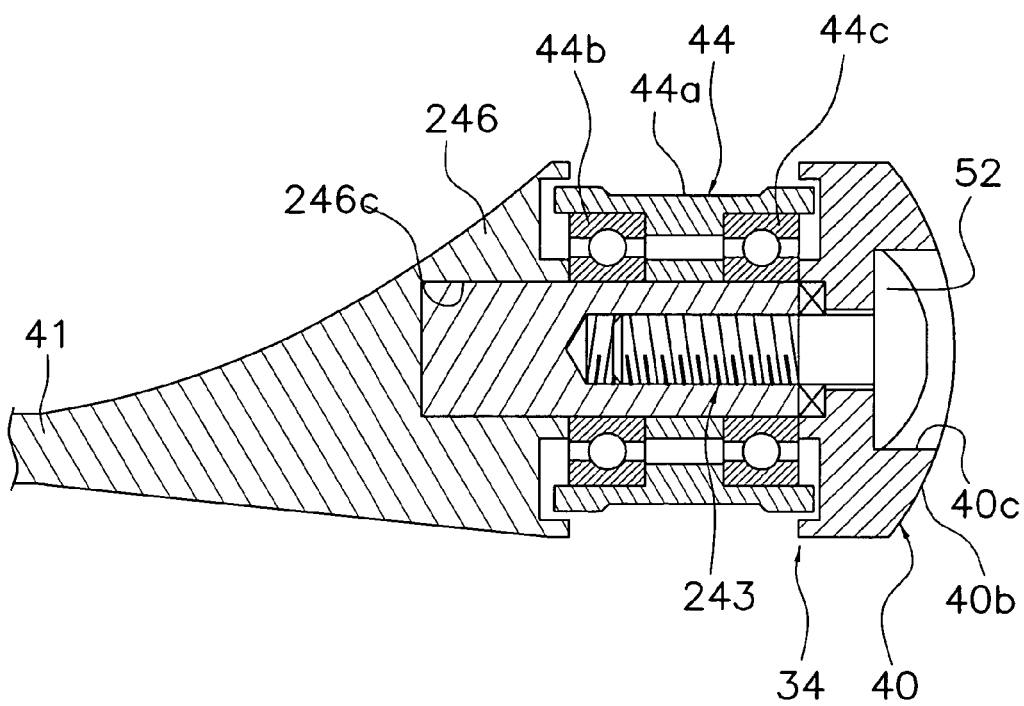
FIG. 12 is a cross-sectional view of the bail arm of the spinning reel in accordance with the variation (f) of the embodiment of the present invention.

Alternatively, as shown in FIG. 12, a separate fixed shaft 243 formed in a rod shape can be press fit into a bore portion 246*c* formed on the fixed shaft cover 246. In this situation, the processing of the fixed shaft 243 will be made easier and manufacturing costs can be kept low.

Variation (g)

Figure 13:
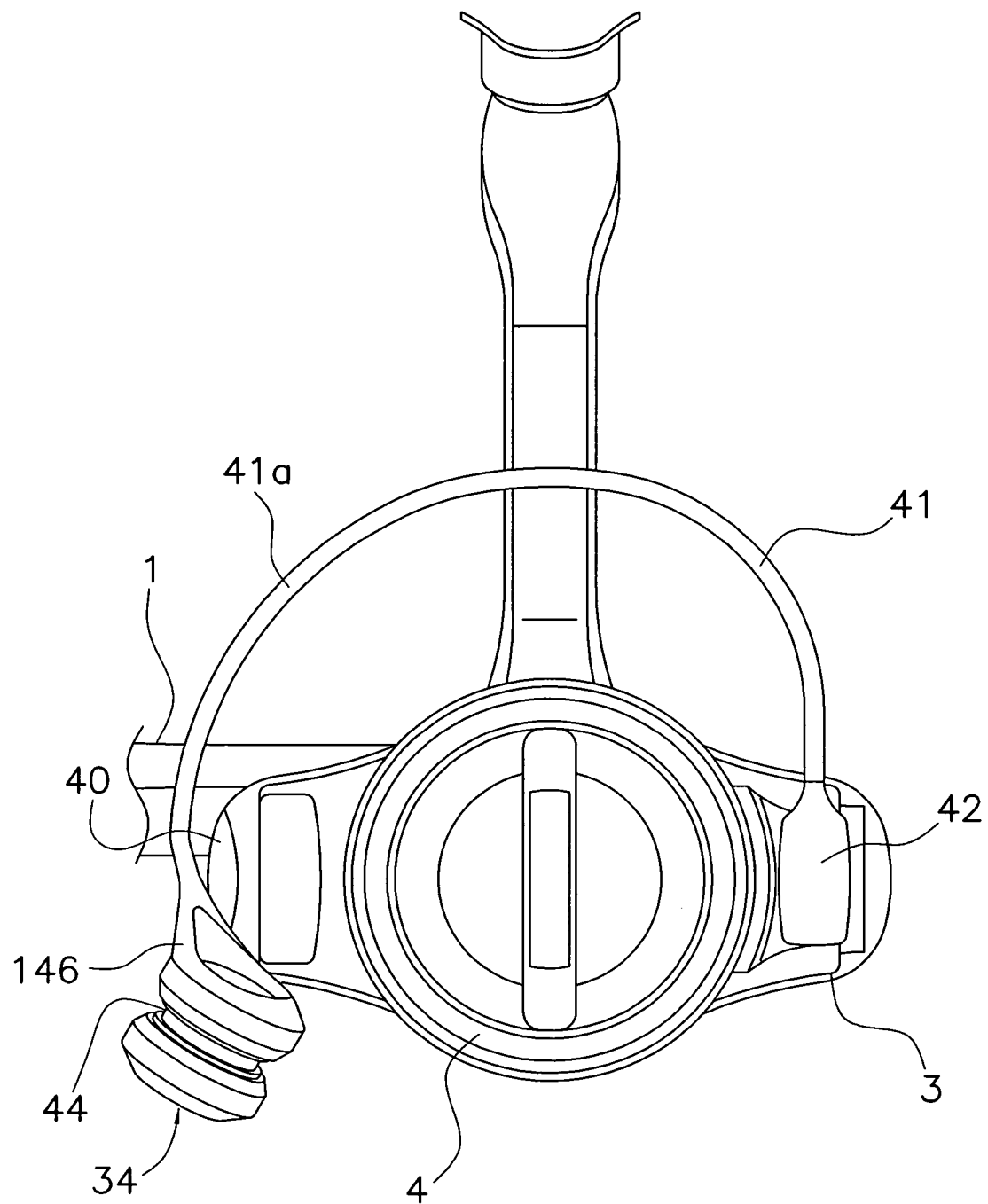
FIG. 13 is a front view of the spinning reel in accordance with the variation (g) of the embodiment of the present invention.

In the aforementioned main embodiment, the second bail support member 42 is integrally formed with the bail 41 from a stainless steel alloy. However, the second bail support member 42 and the bail 41 can be formed separately as shown in FIG. 13. Here, the processing of the second bail support member 42 can be made easier.

Variation (h)

In the aforementioned embodiment, the bail arm 34 is manufactured by processing the base material with a base material preparation process, a forging process, a cutting process and a bending process, in that order. However, the bail arm manufacturing process by which the bail arm 34 is manufactured is not limited thereto.

Figure 14:
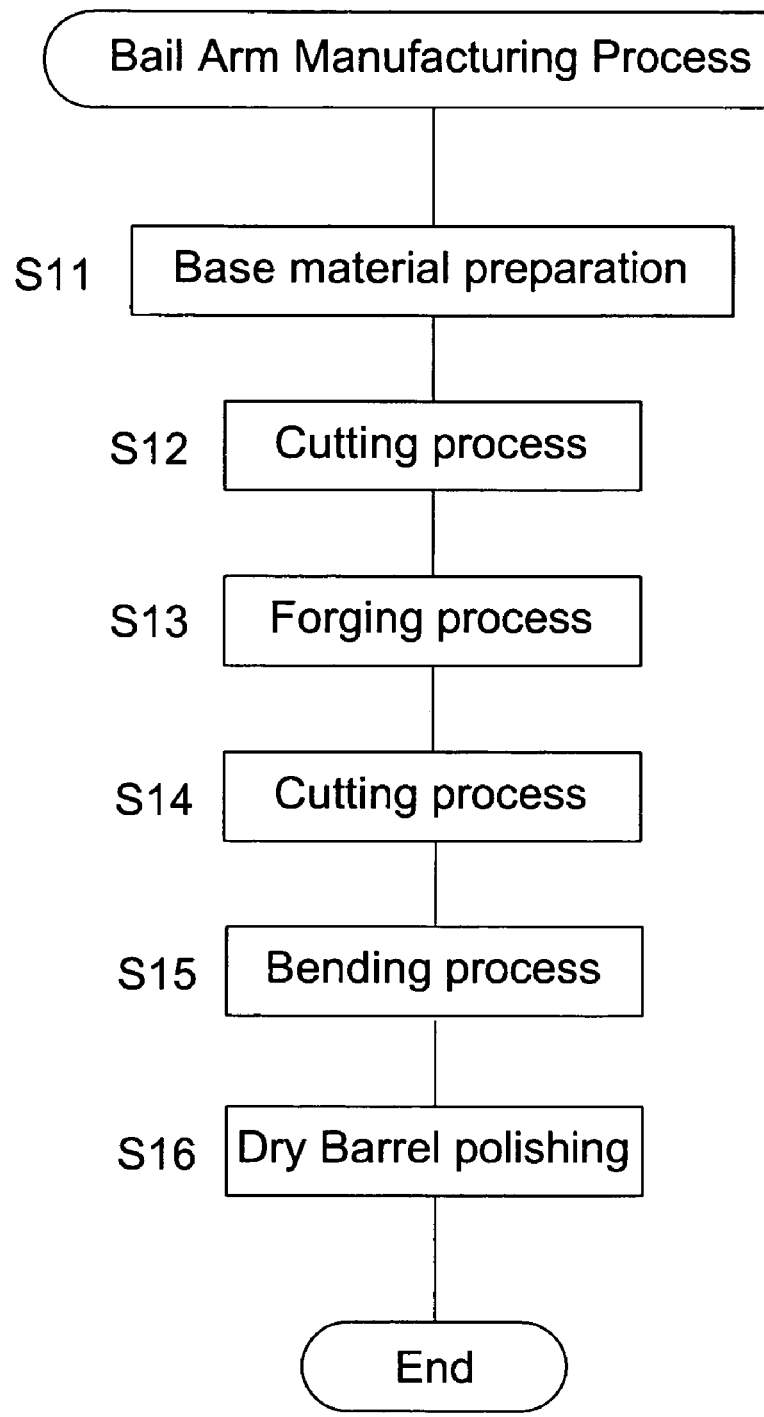
FIG. 14 is a flowchart illustrating a manufacturing process of the bail arm in accordance with the variation (h) of the embodiment of the present invention.
Figure 15:
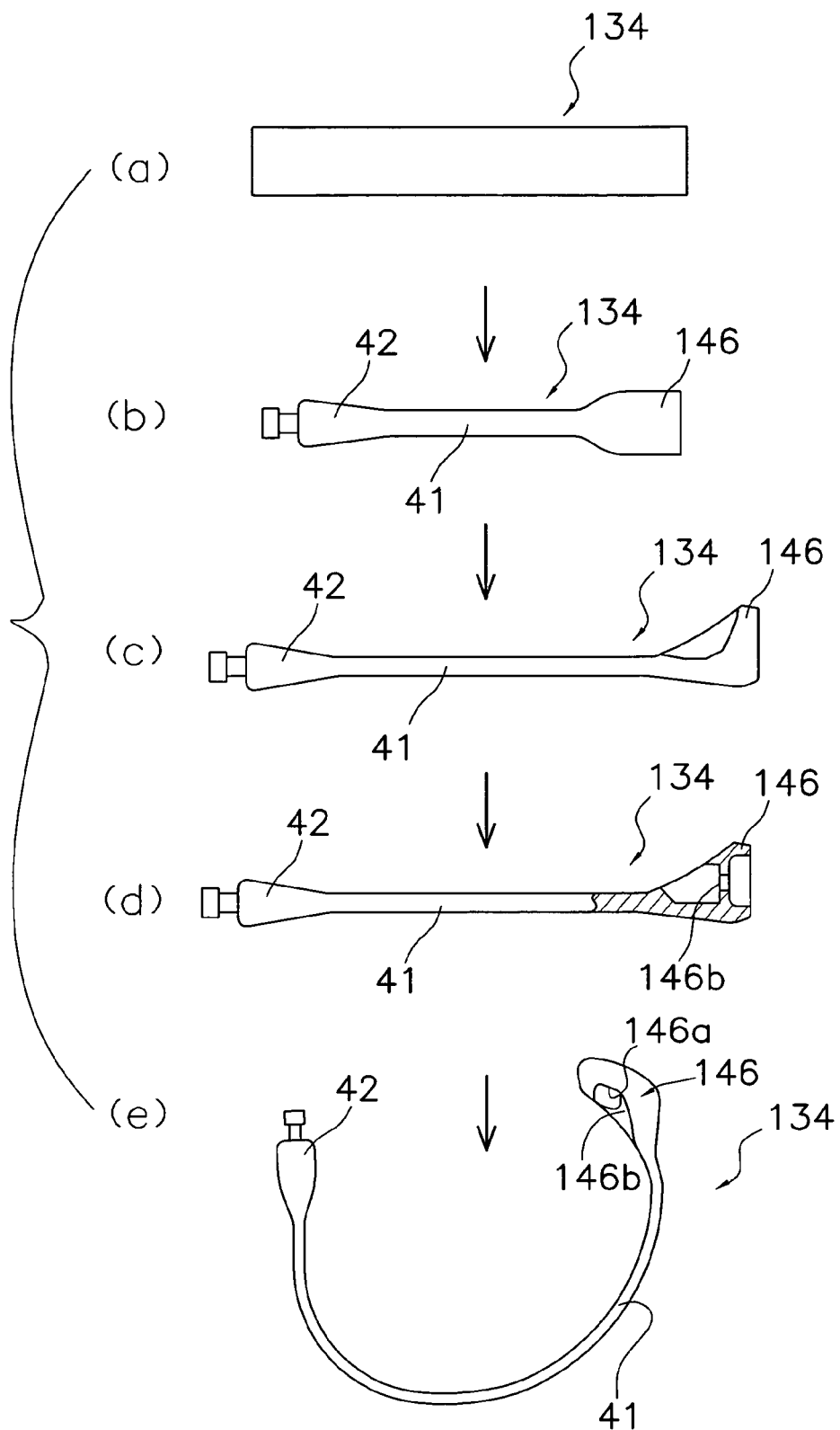
FIG. 15 is a view illustrating a manufacturing process of the bail arm in accordance with the variation (h) of the embodiment of the present invention.

For example, in the bail arm 134 shown in FIG. 9 of the embodiment described in paragraph (e) above in which fixed shaft 143 is separately formed from the fixed shaft cover 146, a manufacturing process in which the bail 41, the second bail support member 42 and the fixed shaft cover 146 are integrally manufactured is shown in FIGS. 14 and 15.

First, in step S11 shown in FIG. 14, a rod-shaped base material made of a stainless steel alloy is provided (see FIG. 15(*a*)). Next, in step S12, an NC lathe or the like is employed to perform a cutting process on the rod-shaped material made of a stainless steel alloy, and a rough outline of the fixed shaft cover 146 and the second bail support member 42 are formed thereby (see FIG. 15(*b*)). Then, by further performing the cutting process on the portion that will become the second bail support member 42, detailed shapes such as the mounting portion of the bail support member 42 will be formed.

Next, in step S13, a forging process is performed on the portion that will be the fixed shaft cover 46, and an approximately truncated conical shape having a recessed portion is formed thereby (see FIG. 15(*c*)). In this type of forging process, a rough flattening process involving die-forging is first performed in order to form the recess on a side of the substantially round conical fixed shaft cover 146. Next, a preliminary flattening, and a first and a second flattening processes that involve die-forging are performed in order to form the fixed shaft cover 146 into an approximately truncated conical shape and also to form a recessed portion at the center thereof. Finally, a finish flattening that involves die-forging is performed in order to form the exterior into a shape that is comparatively close to the finished product. Note that a so-called partial annealing, which includes heating and cooling, is performed after each of the rough flattening, preliminary flattening, and first and second flattening process. This makes it easier to uniformly maintain the hardness of the base material and soften the base material, and makes it easier to perform die forging. After performing the partial annealing after each of the first and the second flattening processes, trimming or barrel polishing is performed. In the trimming, excess portions of the base material are removed. In the barrel polishing, a rough wet barrel, which requires a relatively short polishing time, is used for removing burrs. This allows the fixed shaft cover 146 to be formed into a substantially truncated conical shape having a recessed portion 146*b* with an exterior that is smoothly curved. Note that two separate flattening processes, i.e. the first and the second flattening processes, can be combined into one process.

Next, in step S14, a cutting process is performed on the recessed portion of the forged fixed shaft cover 146, and a through hole 146*b* is formed (see FIG. 15(*d*)). First, a facing process is performed on the recessed portion and the end portion of the fixed shaft cover 146 so as to remove the burrs therefrom. Next, a non-circular hole is formed so that the recessed portion and the end portion of the fixed shaft cover 146 can communicate with each other. Then, the barrel polishing by means of a wet barrel, which requires a comparatively intermediate length of polishing time, is performed. This allows the through hole 146*b* to connect the recessed portion 146*b* and the end portion of the fixed shaft cover 146.

Next, in step S15, a bending process is performed on the portion that will become the bail 41, thereby forming the overall shape of the bail 41 (see FIG. 15(*e*). Finally, at step S16, barrel polishing is performed on the bail 41, the second bail support member 42 and the fixed shaft cover 146. This barrel polishing is a dry barrel that can polish detailed portions of the bail arm 34, and provide a mirror finish thereto. This barrel polishing with a dry barrel requires a comparatively long polishing time.

Through this type of bail arm manufacturing process, it will be easier to manufacture a bail arm 34 in which the exteriors of the fixed shaft 143, the fixed shaft cover 146, the bail 41 and the second bail support member 42 are integrally formed so that they are connected smoothly and continuously.

Variation (i)

Figure 16:
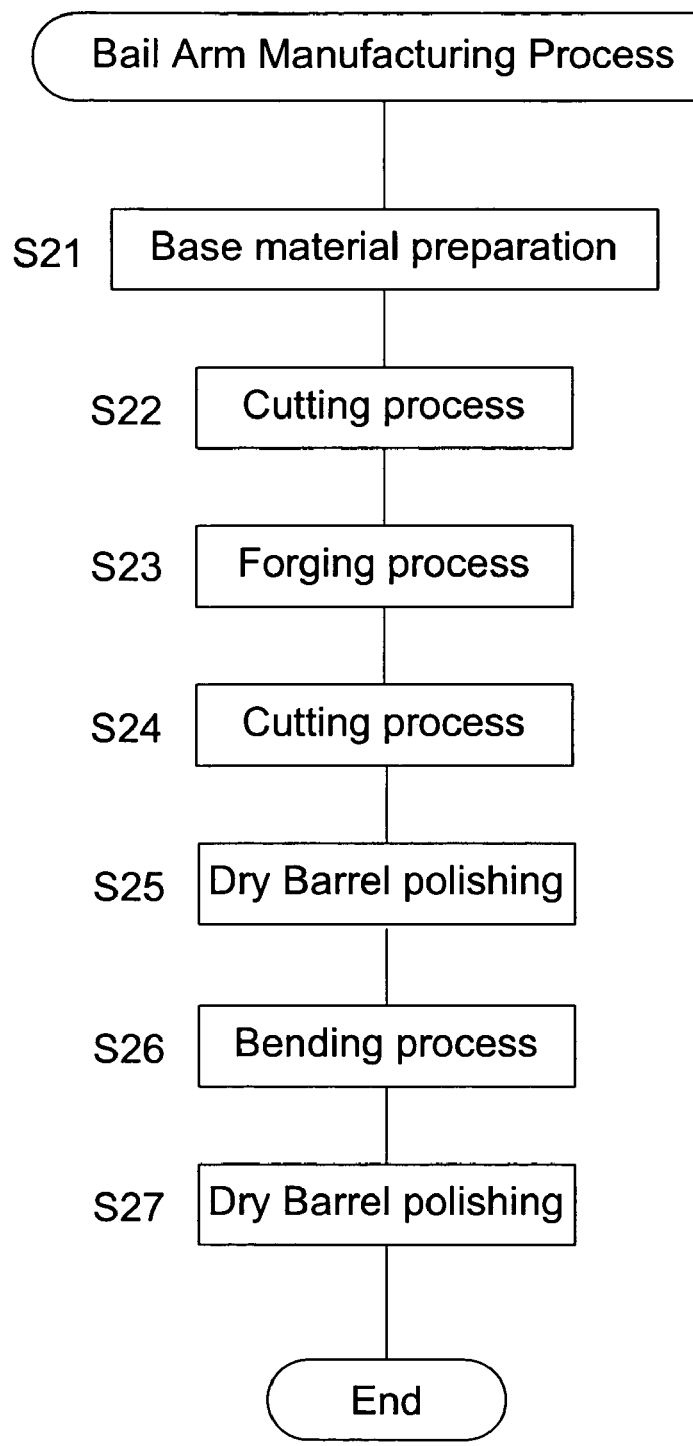
FIG. 16 is a flowchart illustrating a manufacturing process of the bail arm in accordance with another example of the variation (h) of the embodiment of the present invention.

In the aforementioned embodiment described in paragraph (h), the barrel polishing is performed in step S16 after the bending process is performed in step S15. However, as shown in FIG. 16, in addition to the barrel polishing in step S27 that occurs after the bending process in step 26, a dry barrel polishing can be performed at step S25 before the bending process of step S26. Note that a description of these other processes will be omitted because they are the same as the processes shown and described in the embodiment described in the variation (h).

In the aforementioned embodiment (e), the contours of the second engaging portion 143*c* and the second engaged portion 146*c* are formed such that they have oval shapes that have opposing parallel surfaces, but their shapes are not limited thereto and may be formed into any other non-circular shape such as an approximate D-shape, or rectangular shape. In addition, the contours of the second engaging portion 143*c* and the second engaged portion 146*c* do not have to be formed such that they are approximately the same, and may be formed in any shape so long as they can non-rotatably engage with each other.

Variation (j)

Figure 17:
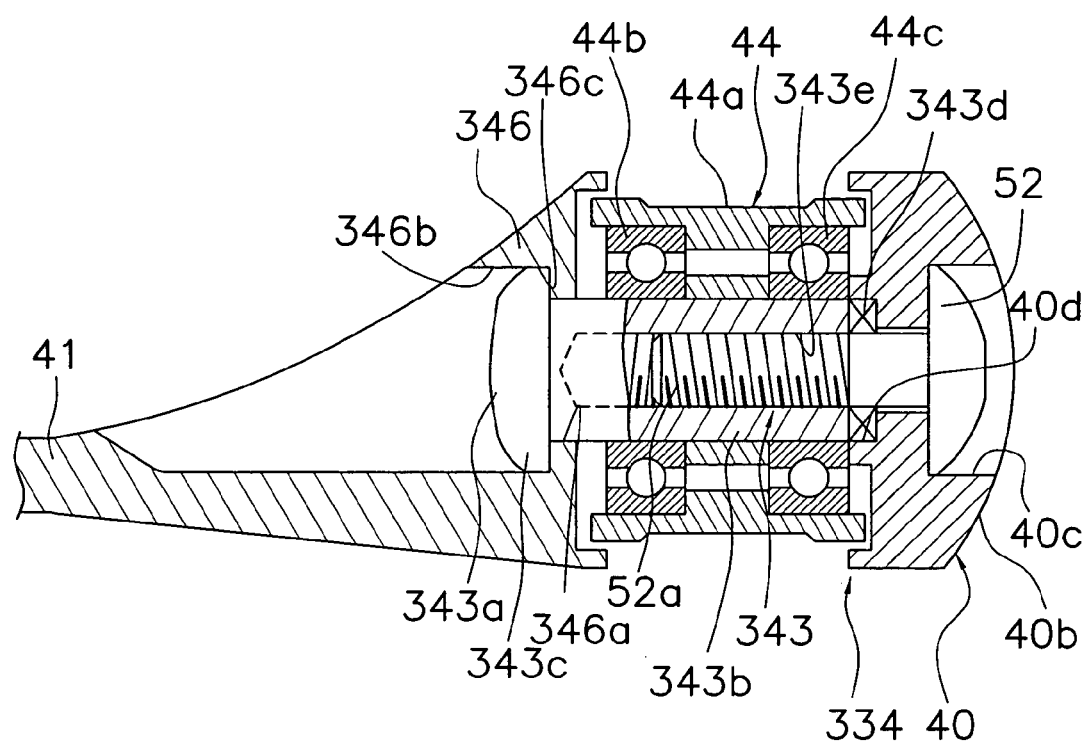
FIG. 17 is a cross-sectional view of the bail arm of the spinning reel in accordance with the variation (j) of the embodiment of the present invention.

In the aforementioned embodiment (e), the second engaging portion 143*c* is formed on the outer periphery of the base end of the shaft portion 143*b* of the fixed shaft 143, and the second engaged portion 146*c* is formed on the inner periphery of the through hole 146*a* of the fixed shaft cover 146. As shown in FIG. 17, however, it is also possible to form a second engaging portion 343*c* on the outer periphery of the head portion 343*a* of the fixed shaft 343 such that the second engaging portion 343*c* has a non-circular outer contour. In this case, a second engaged portion 346*c* is formed in the inner periphery of the closed end of the recessed portion 346*b* of the fixed shaft cover 346 so that the second engaging portion 343*c* non-rotatably engages with the second engaged portion 346*c*. Note that the contours of the through hole 346*a* of the fixed shaft cover 346 and the base end of the shaft portion 343*b* of the fixed shaft 343 do not have to be non-circular, and it can be formed to be, for example, circular.

According to the present invention, in the fishing line guide mechanism and the method of manufacturing the same, the fixed shaft cover and the bail are integrally formed so that the outer contours thereof are smoothly and continuously connected. Thus, fishing line can be guided from the bail to the fixed shaft cover smoothly, and it will be difficult for a line tangling to occur.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2003-114064, 2003-411637, 2003-422026. The entire disclosure of Japanese Patent Application Nos. 2003-114064, 2003-411637, 2003-422026 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fishing line guide mechanism, for guiding fishing line onto a spool of a spinning reel, the fishing line guide mechanism being adapted to be mounted to front ends of a first rotor arm and a second rotor arm so as to be pivotable between a line-guiding posture and a line-releasing posture and comprising:
    a first bail support member and a second bail support member that are adapted to be respectively pivotably mounted to the front ends of the first rotor arm and the second rotor arm, the first bail support member including a first engaged portion;
    a fixed shaft one end of which is coupled to the first bail support member, the fixed shaft including a shaft portion and a first engaging portion that is formed at an end of the shaft portion, the first engaging portion non-rotatably engaging with the first engaged portion;
    a fixed shaft cover that is fixedly attached to another end of the fixed shaft so as to be spaced apart from the first bail support member;
    a line roller that is rotatively supported by the fixed shaft, the line roller having on its outer peripheral surface a guiding portion for guiding the fishing line, the line roller being supported on an outer periphery of the shaft portion; and
    a bail that is curved outward in a circumferential direction of the spool to guide the fishing line onto the line roller via the fixed shaft cover, one end of the bail being fixedly attached to the second bail support member, the fixed shaft cover and the bail being integrally formed from a metal such that the exteriors thereof are smoothly and continuously connected,
    the fixed shaft cover being formed separately from the fixed shaft,
    the fixed shaft including a second engaging portion formed at least partially on an outer periphery of an end of the fixed shaft, and
    the fixed shaft cover including a second engaged portion that is formed at least partially on an end of the fixed shaft cover, the second engaged portion being non-rotatably engaged with the second engaging portion.

2. The fishing line guide mechanism as set forth in claim 1, wherein
    the second engaging portion is formed on the outer periphery of the fixed shaft,
    the fixed shaft cover includes a through hole, the shaft portion passing through the through hole, and
    the second engaged portion is formed on the inner periphery of the through hole.

3. The fishing line guide mechanism as set forth in claim 1, wherein
    the fixed shaft further includes a head portion that has a larger diameter than a diameter of the shaft portion,
    the second engaging portion is formed on the outer periphery of the head portion,
    the fixed shaft cover includes a recessed portion and a through hole that is formed within the recessed portion, the through hole having a diameter smaller than a diameter of the head portion, the shaft portion passing through the through hole, the head portion being accommodated in the recessed portion, and
    the second engaged portion is formed on the inner periphery of the recessed portion.

4. The fishing line guide mechanism as set forth in claim 1, wherein
    the second engaging portion and the second engaged portion are formed in non-circular shapes.

5. A method of manufacturing a fishing line guide mechanism for a spinning reel in which a fixed shaft cover and a bail that form the fishing line guide mechanism are integrally formed from a metal as a one-piece unitary member, the fishing line guide mechanism being adapted to be pivotably mounted to front ends of a first rotor arm and a second rotor arm of the spinning reel, the method of manufacturing a fishing line guide mechanism for a spinning reel comprising:
    a base material providing process in which a metal base material that will become the fixed shaft cover and the bail is provided;
    a metal forming process in which metal-forming is performed on at least one of a portion that will become the fixed shaft cover and a portion that will become the bail;
    a first cutting process in which cutting is performed on at least the portion of the base material that will become the fixed shaft cover; and
    a bending process in which bending is performed on at least a portion of the base material that will become the bail.

6. The method of manufacturing a fishing line guide mechanism as set forth in claim 5, wherein
    the metal forming process includes a forging process in which forging is performed.

7. The method of manufacturing a fishing line guide mechanism as set forth in claim 6, wherein
    the forging process is performed on both of the portions that will become the fixed shaft cover and the bail.

8. The method of manufacturing a fishing line guide mechanism as set forth in claim 5, further comprising
    a barrel polishing in which dry barrel polishing is performed on at least one of the portion of the base material that will become the fixed shaft cover and the portion that will become the bail, the barrel polishing being performed after the bending process.

9. A spinning reel, comprising:
    a handle;
    a reel unit that rotatively supports the handle;
    a rotor that is rotatively supported at a front of the reel unit, the rotor including a cylindrical portion, a fishing line guide mechanism, and first and second rotor arms that are disposed opposite one another at sides of the cylindrical portion; and
    a spool that has fishing line wound around an outer peripheral surface thereof, and is disposed at a front of the rotor so as to be shiftable back and forth;

the fishing line guide mechanism being for guiding the fishing line to the spool and mounted to front ends of the first rotor arm and the second rotor arm so as to be pivotable between a line-guiding posture and a line-releasing posture, the fishing line guide mechanism including a first bail support member and a second bail support member that are respectively pivotably mounted to the front ends of the first rotor arm and the second rotor arm, the first bail support member including a first engaged portion, a fixed shaft one end of which is coupled to the first bail support member the fixed shaft including a shaft portion and a first engaging portion that is formed at an end of the shaft portion, the first engaging portion non-rotatably engages with the first engaged portion, the first engaging portion projecting along an axial direction of the fixed shaft and the first engaged portion having a recess configured to engage the first engaging portion, a fixed shaft cover that is fixedly attached to another end of the fixed shaft so as to be spaced apart from the first bail support member;

a line roller that is rotatively supported by the fixed shaft, the line roller having on its outer peripheral surface a guiding portion for guiding the fishing line, the line roller being supported on an outer periphery of the shaft portion; and a bail that is curved outward in the a circumferential direction of the spool to guide the fishing line onto the line roller via the fixed shaft cover, one end of the bail being fixedly attached to the second bail support member, the fixed shaft cover and the bail being integrally formed from a metal such that the exteriors thereof are smoothly and continuously connected.

10. The spinning reel as set forth in claim 9, wherein the fixed shaft cover and the bail are made of a stainless steel alloy.

11. The spinning reel as set forth in claim 9, wherein the fixed shaft is a metal component formed integrally with the fixed shaft cover as a one-piece unitary member.

12. The spinning reel as set forth in claim 9, wherein the second bail support member is a metal component formed integrally with the bail as a one-piece unitary member.

13. The spinning reel as set forth in claim 9 wherein the fixed shaft further includes a head portion that has a larger diameter than a diameter of the shaft portion; and the fixed shaft cover includes a recessed portion and a through hole, the through hole being formed within the recessed portion and having a diameter smaller than that of the head portion, the shaft portion passing through the through hole, the head portion being accommodated in the recessed portion.

14. The spinning reel as set forth in claim 9, wherein the fixed shaft cover is formed separately from the fixed shaft,
the fixed shaft cover has a bore portion into which an end of the fixed shaft is press fitted.

15. The spinning reel as set forth in claim 9, wherein the fixed shaft cover is formed separately from the fixed shaft,
the fixed shaft includes a second engaging portion formed at least partially on an outer periphery of an end of the fixed shaft, and
the fixed shaft cover includes a second engaged portion that is formed at least partially on an end of the fixed shaft cover, the second engaged portion being non-rotatably engaged with the second engaging portion.

16. The spinning reel as set forth in claim 9, wherein the first engaging portion has an outer contour that is approximately the same as a contour of the first engaged portion.

17. A spinning reel comprising:
a handle;
a reel unit that rotatively supports the handle;
a rotor that is rotatively supported at a front of the reel unit, the rotor including a cylindrical portion, a fishing line guide mechanism, and first and second rotor arms that are disposed opposite one another at sides of the cylindrical portion; and
a spool that has fishing line wound around an outer peripheral surface thereof, and is disposed at a front of the rotor so as to be shiftable back and forth,
the fishing line guide mechanism being for guiding the fishing line to the spool and mounted to front ends of the first rotor arm and the second rotor arm so as to be pivotable between a line-guiding posture and a line-releasing posture, the fishing line guide mechanism including a first bail support member and a second bail support member that are respectively pivotably mounted to the front ends of the first rotor arm and the second rotor arm, the first bail support member including a first engaged portion, a fixed shaft one end of which is coupled to the first bail support member, the fixed shaft including a shaft portion and a first engaging portion that is formed at an end of the shaft portion, the first engaging portion non-rotatably engages with the first engaged portion, a fixed shaft cover that is fixedly attached to another end of the fixed shaft so as to be spaced apart from the first bail support member, a line roller that is rotatively supported by the fixed shaft, the line roller having on its outer peripheral surface a guiding portion for guiding the fishing line, the line roller being supported on an outer periphery of the shaft portion, and a bail that is curved outward in a circumferential direction of the spool to guide the fishing line onto the line roller via the fixed shaft cover, one end of the bail being fixedly attached to the second bail support member, the fixed shaft cover and the bail being integrally formed from a metal such that the exteriors thereof are smoothly and continuously connected, the fixed shaft cover being formed separately from the fixed shaft, the fixed shaft including a second engaging portion formed at least partially on an outer periphery of an end of the fixed shaft, and the fixed shaft cover including a second engaged portion that is formed at least partially on an end of the fixed shaft cover, the second engaged portion being non-rotatably engaged with the second engaging portion.

18. The spinning reel as set forth in claim 17, wherein
the second engaging portion is formed on the outer periphery of the fixed shaft,
the fixed shaft cover includes a through hole, the shaft portion passing through the through hole, and
the second engaged portion is formed on the inner periphery of the through hole.

19. The spinning reel as set forth in claim 17, wherein
the fixed shaft further includes a head portion that has a larger diameter than a diameter of the shaft portion,
the second engaging portion is formed on the outer periphery of the head portion,
the fixed shaft cover includes a recessed portion and a through hole that is formed within the recessed portion, the through hole having a diameter smaller than a diameter of the head portion, the shaft portion passing through the through hole, the head portion being accommodated in the recessed portion, and
the second engaged portion is formed on the inner periphery of the recessed portion.

20. The spinning reel as set forth in claim 17, wherein
the second engaging portion and the second engaged portion are formed in non-circular shapes.

* * * * *

UNITED STATES PATENT AND TRADEMARK OFFICE
CERTIFICATE OF CORRECTION

| | |
|---|---|
| PATENT NO. | : 7,083,133 B2 |
| APPLICATION NO. | : 10/811954 |
| DATED | : August 1, 2006 |
| INVENTOR(S) | : Ken'icii Sugawara |

Page 1 of 1

It is certified that error appears in the above-identified patent and that said Letters Patent is hereby corrected as shown below:

On the Title page, Item (22) Filed: that reads "Mar. 3, 2004" should read -- Mar. 30, 2004 --

Signed and Sealed this

Twenty-first Day of November, 2006

JON W. DUDAS
*Director of the United States Patent and Trademark Office*